(12) United States Patent
Hutsell et al.

(10) Patent No.: US 8,271,746 B1
(45) Date of Patent: *Sep. 18, 2012

(54) TIERING OF LINEAR CLIENTS

(75) Inventors: Brian D. Hutsell, Fort Worth, TX (US); James M. Van Dyke, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 11/612,145

(22) Filed: Dec. 18, 2006

Related U.S. Application Data (60) Provisional application No. 60/864,343, filed on Nov. 3, 2006.

(51) Int. Cl.
  *G06F 12/00* (2006.01)
  *G06F 13/00* (2006.01)
  *G06F 13/28* (2006.01)
(52) U.S. Cl. ....................................... 711/156
(58) Field of Classification Search .................. 711/156
  See application file for complete search history.

(56) References Cited

U.S. PATENT DOCUMENTS

| | | | | |
|---|---|---|---|---|
| 5,778,419 | A * | 7/1998 | Hansen et al. | 711/112 |
| 5,884,067 | A * | 3/1999 | Storm et al. | 345/533 |
| 6,647,456 | B1 * | 11/2003 | Van Dyke et al. | 711/105 |
| 6,922,770 | B2 * | 7/2005 | Shanmugasundaram et al. | 711/209 |
| 6,957,298 | B1 * | 10/2005 | Van Dyke et al. | 711/105 |
| 7,617,368 | B2 * | 11/2009 | Van Dyke et al. | 711/156 |
| 2001/0019331 | A1 * | 9/2001 | Nielsen et al. | 345/542 |
| 2002/0065981 | A1 * | 5/2002 | Jenne et al. | 711/105 |
| 2002/0174292 | A1 * | 11/2002 | Morita et al. | 711/105 |
| 2002/0174318 | A1 | 11/2002 | Stuttard et al. | |
| 2003/0033493 | A1 * | 2/2003 | Cismas | 711/158 |
| 2004/0088486 | A1 * | 5/2004 | Piccirillo et al. | 711/115 |
| 2007/0150688 | A1 * | 6/2007 | Osborne et al. | 711/168 |
| 2009/0282189 | A1 * | 11/2009 | Best et al. | 711/106 |

* cited by examiner

*Primary Examiner* — Sheng-Jen Tsai
(74) *Attorney, Agent, or Firm* — Kilpatrick Townsend & Stockton LLP (57) ABSTRACT

Efficient memory management can be performed using a computer system that includes a client which requests access to a memory, a memory interface coupled to the client and to the memory, wherein the memory interface comprises an arbiter to arbitrate requests received from the client to access data stored in the memory, a look ahead structure for managing the memory, a request queue for queuing memory access requests, and wherein the look ahead structure is located before the arbiter so that the look ahead structure communicates with the memory through the arbiter. Efficient memory management can also be performed by sending a memory access request from a client to a look ahead structure and to a request queue, wherein the look ahead structure comprises a row bank direction queue and a tiering logic, checking state of memory being requested using the tiering logic, prioritizing memory requests according to the memory state, selecting a location to be precharged with a precharge arbiter, selecting a location to be activated using an activate arbiter, selecting a location to read or write using a read/write arbiter, and precharging, activating and reading or writing according the selections according to availability of the memory.

26 Claims, 6 Drawing Sheets

TIERING OF LINEAR CLIENTS

CROSS-REFERENCES TO RELATED APPLICATIONS

This application claims the benefit of U.S. Provisional Application No. 60/864,343, filed Nov. 3, 2006, which disclosure is incorporated by reference in its entirety for all purposes.

BACKGROUND OF THE INVENTION

The present invention relates generally to processing memory requests in a computer system and in particular to methods and systems for efficiently retrieving data from memory for a graphics processing unit having multiple clients.

In current graphics processing systems, the number and processing speed of memory clients have increased enough to make memory access latency a barrier to achieving high performance. In some instances, various memory clients share a common memory, and each memory client issues requests for data stored in the common memory based on individual memory access requirements. Requests from these memory clients are typically serialized through a common interface. As a result, requests are sometimes queued up and processed on a first-in-first-out (FIFO) basis. This can result in slow inefficient processing of memory requests.

Since many computers are configured to use Dynamic Random Access Memory (DRAM) or synchronous DRAM (SDRAM), memory requests are also configured to retrieve data from these types of memories. DRAMs use a simple memory cell geometry that permits implementation of large memory arrays at minimum cost and power consumption on a single semiconductor chip. In a DRAM, all of the cells in a given group of memory locations, or a so-called "row," are activated at the same time. Multiple read or write operations can thus be performed with various cells within the row, but only while it is active. If a new access is to be made to a different row, a precharge operation must be completed to close the presently active row then an activate operation must be performed to a different row. SDRAM, on the other hand uses a master clock signal to synchronously perform read/write accesses and refresh cycles. SDRAM arrays can also be split into two or more independent memory banks, and two or more rows can therefore be active simultaneously, with one open row per independent bank.

DRAM memory has much slower access times then SDRAM memory. The DRAM access time is slow because the switching speed within a conventional DRAM memory cell is not as fast as the switching speeds now common in central processing units (CPUs). As a result, when using high speed processors with conventional DRAMs, the processor must frequently wait for memory accesses to be completed. For example, delays equal to the precharge time and activate time are experienced whenever a different row must be accessed on a subsequent transaction. However, the precharge operation is only necessary if the row address changes; if the row address does not change on the subsequent access, the precharge operation has been unnecessarily executed and the device unnecessarily placed in an idle state.

SDRAM, on the other hand, may be accessed by multiple components such as a central processing unit (CPU), display refresh module, graphics unit, etc. Different components are given varying levels of priority based on the effect of latency on the component. For example, a display refresh module may be given a higher priority in accessing the SDRAM since any latency may result in easily-noticed, detrimental visual effects. If a computer system is designed to support interleaved accesses to multiple rows, SDRAMs make it possible to complete these accesses without intervening precharge and activate operations, provided that the rows to be accessed are all in separate SDRAM banks.

Figure 1:
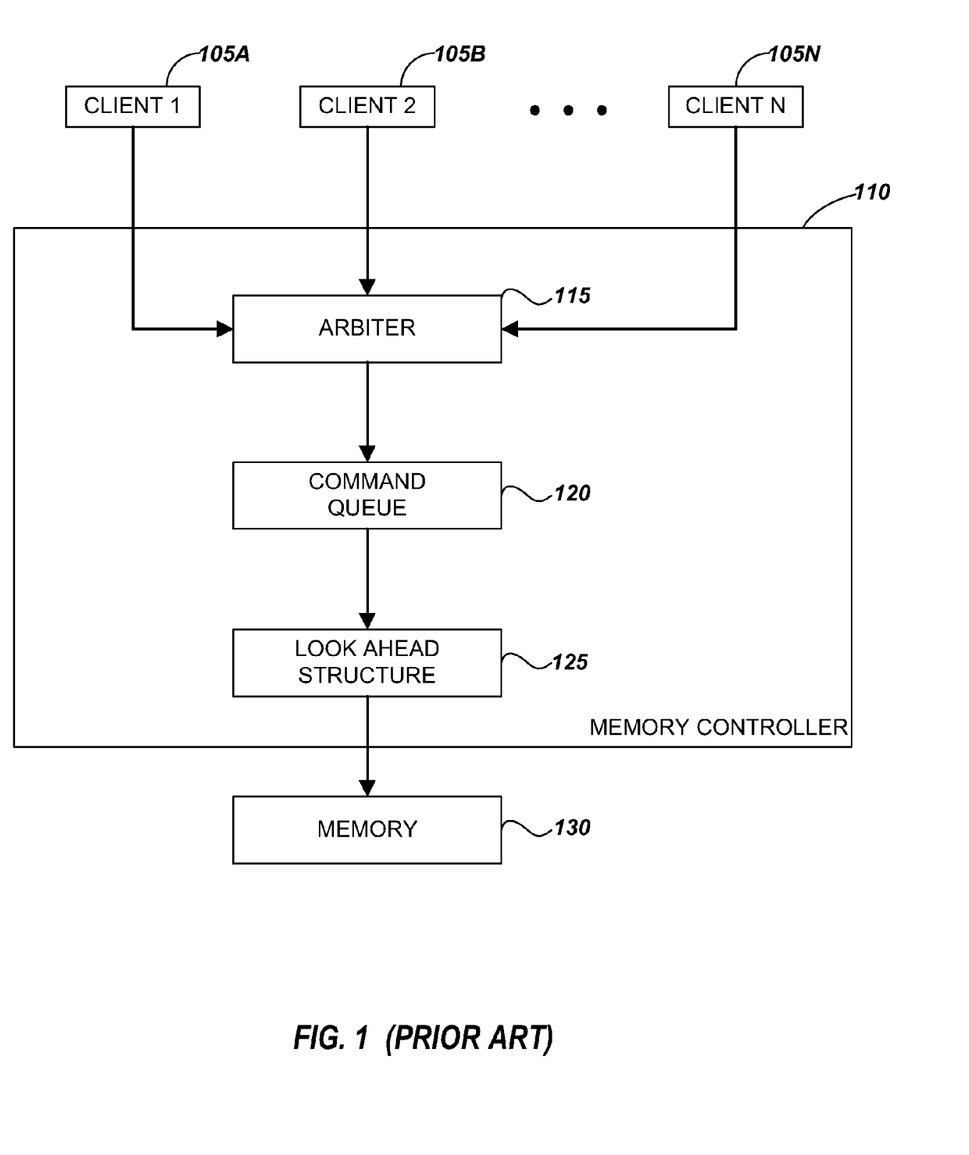
FIG. 1 illustrates a prior art computer system with the display engine requesting data from the memory controller.

Regardless of whether DRAM or SDRAM is used, a command queue is used to pipeline requests from the clients requesting memory (i.e. a graphics display, texturing, rendering, etc.) to the memory controller and the memory. FIG. 1 illustrates a prior art pipeline for a computer system including N clients (client 1 105A, client 2 105B, . . . , client N 105N), a memory controller 110, an arbiter 115, a command queue 120, a look ahead structure 125, and a memory 130. In the prior art, the clients 105A through 105N determine when more data is needed and send individual requests to the memory controller 110 requesting that the memory controller 110 retrieve the specific data from the memory 130. The individual requests include the address, width and size of each array of data being requested. The memory controller 110 then uses the arbiter 115 to prioritize the requests and queues up those requests using command queue 120. Once the memory controller has queued up the individual memory requests, the look ahead structure 125 prefetches the requested data from the memory 130. The retrieved data is sent back to the clients 105A, . . . , 105N where it is stored in a respective client buffer until it is needed by the client 105A, . . . , 105N. The client 105A, . . . , 105N then processes the retrieved data.

Since memory controller 110 only uses one arbiter, the command queue 120 uses three pointers to process the memory request. The pointers include one pointer for precharging, one pointer for activating, and one pointer for reading/writing. Since there is only one arbitration point, there is less flexibility in managing DRAM bank state than with three arbiters (precharge, activate, read/write.) Moreover, if the client is isochronous, the command queue 120 can cause a bottleneck and increase read access time for the isochronous client. Many queued requests in the command queue take time to execute in the DRAM, thus adding to the isochronous client access time Memory systems lacking command queues can couple the arbiters closely to the DRAM bank state. This allows better decision making when precharging and activating banks. Banks are not scheduled for precharge and activate until the bank is ready to accept the command. Delaying the arbitration decision allows later arriving clients to participate, resulting in a better arbitration decision.

Another problem can occur when multiple RMWs (read-modify-writes) occupy the command queue. Graphics chips utilizing frame buffer data compression in order to increase effective memory bandwidth can incur high RMW delay penalties when a compression unaware client writes over part of an existing compressed data tile in memory. The memory system must perform an RMW cycle comprised of a read, decompression, and write backs to the frame buffer. An RMW operation lasts ten of cycles, and multiple RMW requests queued in the command queue may substantially delay a subsequent isochronous read request.

For example, one problem with the prior art is that the serial nature of the FIFO command queue 120 can make it difficult for arbiter 115 to make selections avoid bank conflicts and therefore not waste clock cycles. Moreover, some commands can require long access time while other commands may have variable access times. It may be difficult for the arbiter to have knowledge of the number of DRAM cycles in the command queue due to compressed reads. As a consequence, in some applications it is difficult for arbiter 115 to make arbitration decisions that efficiently utilize memory 130, resulting in lost clock cycles and reduced performance. Another problem with the prior art, is latency introduced by command queue 120. Ideally, enough delay is introduced between the precharge, activate, and read/write commands to facilitate overlapping bank operations. However, too much delay adds latency to memory requests which requires more latency buffering in the clients, thus increasing chip area. Latency problems become more severe when several requests are in the command queue. These latencies can reduce performance by as much as ⅓.

A system without a command queue works well when there are many available clients requesting different DRAM banks. This allows the arbiter to interleave groups of client requests to the different DRAM banks and hide DRAM page management. When only a single client is active, all the traffic to different DRAM banks to hide DRAM page management must come from that one client.

Therefore, what is needed is a system and method for the client that allows the arbiter to look ahead in the client request stream in order to prepare DRAM banks by precharging and activating. With this system and method, the DRAM page management can be hidden behind read/write transfers, resulting in higher DRAM efficiency and lower read latency to the client. It is this look ahead mechanism that is the scope of this invention.

BRIEF SUMMARY OF THE INVENTION

Embodiments of the present invention provide techniques and apparatuses for efficiently managing memory requests. The embodiments can be used when either one or more clients are present and the one or more clients simultaneously request access to the memory. The present invention uses look ahead structures for memory management. The look ahead structures are placed before the arbiters and are used to precharge and activate banks ahead of actually unloading the requests. Rather than implementing a command-queue per linear client, the look ahead structure is used prior to the arbiter which enables bank management to be performed early without excessive per-client dedicated buffering. Additionally, the look ahead structures are used for pipelining requests to a precharge, activate, and read-write arbiter.

In an embodiment of the present invention, a computer system for efficiently managing memory requests includes a client that requests access to a memory, a memory interface coupled to the client and to the memory, wherein the memory interface comprises an arbiter to arbitrate requests received from the client to access data stored in the memory, a look ahead structure for managing the memory, a request queue for queuing memory access requests, and wherein the look ahead structure is located before the arbiter so that the look ahead structure communicates with the memory through the arbiter. The look ahead structure can include a row-bank-direction queue and a tiering logic. The row-bank-direction queue is configured to process data in parallel to the request queue.

In another embodiment of the invention, the row-bank-direction queue is coupled to the tiering logic.

In yet another embodiment of the invention, the request queue includes a read-modify-write (RMW) operation field and a column address.

In yet another embodiment of the invention, the arbiter can include a precharge arbiter and an activate arbiter, wherein the tiering logic is coupled to the precharge arbiter and the activate arbiter.

In yet another embodiment of the invention, the arbiter can include a read/write arbiter and the row-bank-direction queue is coupled to the read/write arbiter.

In yet another embodiment of the invention, the look ahead structure further includes a tiering logic control coupled to the tiering logic.

In another embodiment of the present invention, a computer system for efficiently managing memory requests includes a client that requests access to a memory, a request queue coupled to the client for queuing the memory requests, a memory interface coupled to the client and to the memory, wherein the memory interface comprises a precharge arbiter, an activate arbiter, a read/write arbiter, and a memory controller, and a look ahead structure coupled to the memory interface, wherein the look ahead structure communicates with the memory controller through either the precharge arbiter, the activate arbiter, or the read/write arbiter. The look ahead structure can include a row-bank-direction queue and a tiering logic. The row-bank-direction queue is configured to process data in parallel to the request queue.

In yet another embodiment of the invention, the computer system can further include a Hit-Miss-Closed Module coupled to the precharge arbiter, the activate arbiter, the read/write arbiter, the DRAM bank state, and the tiering logic.

In yet another embodiment of the invention, the look ahead structure further includes tier selects, wherein the tier select mux outputs are coupled to the precharge arbiter.

In yet another embodiment of the invention, the tiering logic further includes tier selects, wherein the tier select mux outputs are coupled to the activate arbiter.

In yet another embodiment of the invention, the computer system further includes a bank state module coupled to the memory controller and the Hit-Miss-Closed Module, the bank state module collects and disperses the state of the memory banks in response to requests from the look ahead structure.

In yet another embodiment of the invention, the request queue is coupled to the read/write arbiter, and wherein the row-bank-direction queue is coupled to the precharge and activate arbiters and to the tiering logic.

In another embodiment of the present invention, a method for efficiently managing memory requests includes sending a memory access request from a client to a look ahead structure and to a request queue, wherein the look ahead structure comprises a row bank direction queue and a tiering logic, checking state of memory being requested using the tiering logic, prioritizing memory requests according to the memory state, selecting a location to be precharged with a precharge arbiter, selecting a location to be activated using an activate arbiter, selecting a location to read or write using a read/write arbiter, and precharging, activating and reading or writing according the selections according to availability of the memory.

In yet another embodiment of the invention, sending the memory request to the look ahead structure further includes sending the memory request to the row bank direction queue and then to the tiering logic, wherein the tiering logic prioritizes between a plurality of memory requests using the tier selects.

In yet another embodiment of the invention, the method further includes sending the memory request from the request queue to a read/write arbiter and then sending the request queue from the read write arbiter to the memory controller.

In yet another embodiment of the invention, the method further includes sending the row bank direction queue through a tier select multiplexer before the precharge arbiter, activate arbiter, and read/write arbiter.

In yet another embodiment of the invention, the method further includes relaying the bank state as a hit miss or closed to the precharge arbiter, the activate arbiter, and the read/write arbiter.

DETAILED DESCRIPTION OF THE INVENTION

Embodiments of the present invention use look ahead structures for memory management. The look ahead structures allow for bank management to be performed early without excessive per-client dedicated buffering. In embodiments where the command queue has been removed, the look ahead structures are used to precharge and activate banks ahead of actually unloading the requests. Additionally, the look ahead structures are used for pipelining a precharge, activate, and read-write arbiter.

Previously a command queue was used to pipeline requests to hide their bank management overhead for all clients. However, in some embodiments the command queue has been removed. In order to precharge and activate banks ahead of actually unloading memory requests a look ahead structure is used. The look ahead structure allows for bank management to be performed early without excessive per-client dedicated buffering.

Figure 2:
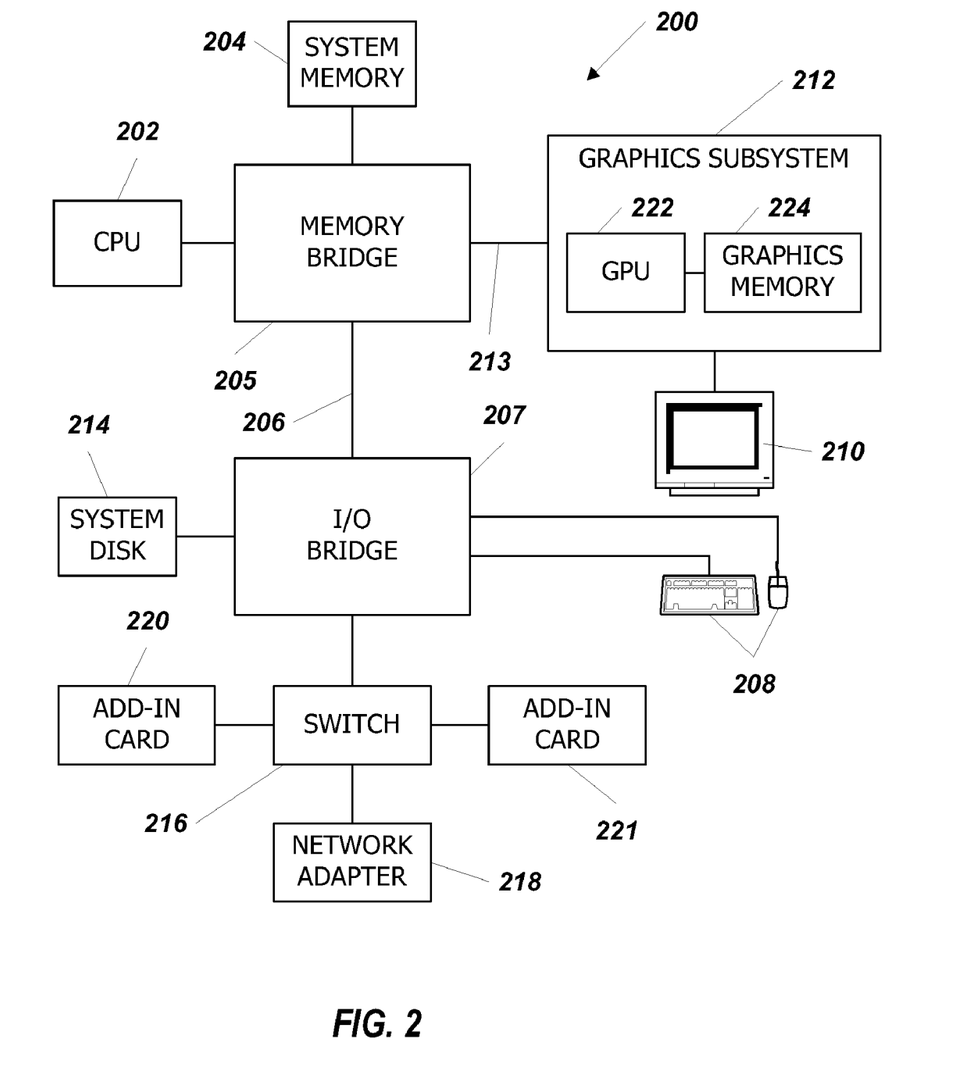
FIG. 2 illustrates a computer system that can be operated in accordance with an embodiment of the invention.

FIG. 2 is a block diagram of a computer system 200 according to an embodiment of the present invention. Computer system 200 includes a central processing unit (CPU) 202 and a system memory 204 communicating via a bus path that includes a memory bridge 205. Memory bridge 205, which may be, e.g., a conventional Northbridge chip, is connected via a bus or other communication path 206 (e.g., a HyperTransport link) to an I/O (input/output) bridge 207. I/O bridge 207, which may be, e.g., a conventional Southbridge chip, receives user input from one or more user input devices 208 (e.g., keyboard, mouse) and forwards the input to CPU 202 via bus 206 and memory bridge 205. Display output is provided on a pixel based display device 210 (e.g., a conventional CRT or LCD based monitor) operating under control of a graphics subsystem 212 coupled to memory bridge 205 via a bus or other communication path 213, e.g., a PCI Express (PCI-E) or Accelerated Graphics Port (AGP) link. A system disk 214 is also connected to I/O bridge 207. A switch 216 provides connections between I/O bridge 207 and other components such as a network adapter 218 and various add-in cards 220, 221. Other components (not explicitly shown), including USB or other port connections, CD drives, DVD drives, and the like, may also be connected to I/O bridge 207. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 212 includes a graphics processing unit (GPU) 222 and a graphics memory 224, which may be implemented, e.g., using one or more integrated circuit devices such as programmable processors, application specific integrated circuits (ASICs), and memory devices. GPU 222 may be configured to perform various tasks related to generating pixel data from graphics data supplied by CPU 202 and/or system memory 204 via memory bridge 205 and bus 213, interacting with graphics memory 224 to store and update pixel data, and the like. For example, GPU 222 may generate pixel data from 2-D or 3-D scene data provided by various programs executing on CPU 202. GPU 222 may also store pixel data received via memory bridge 205 to graphics memory 224 with or without further processing. GPU 222 also includes a display engine configured to deliver pixel data from graphics memory 224 to display device 210. The display engine is an isochronous processing engine that obtains pixel data from graphics memory 204 using contracts, as described below.

CPU 202 operates as the master processor of system 200, controlling and coordinating operations of other system components. In particular, CPU 202 issues commands that control the operation of GPU 222. In some embodiments, CPU 202 writes a stream of commands for GPU 222 to a command buffer, which may be in system memory 204, graphics memory 224, or another storage location accessible to both CPU 202 and GPU 222. GPU 222 reads the command stream from the command buffer and executes commands asynchronously with operation of CPU 202. The commands may include conventional rendering commands for generating images as well as general-purpose computation commands that enable applications executing on CPU 202 to leverage the computational power of GPU 222 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies, graphics subsystem 212 is connected to I/O bridge 207 rather than to memory bridge 205. In still other embodiments, I/O bridge 207 and memory bridge 205 might be integrated into a single chip. The particular components shown herein are optional; for instance, any number of add-in cards or peripheral devices might be supported. In some embodiments, switch 216 is eliminated, and network adapter 218 and add-in cards 220, 221 connect directly to I/O bridge 207.

The connection of GPU 222 to the rest of system 200 may also be varied. In some embodiments, graphics system 212 is implemented as an add-in card that can be inserted into an expansion slot of system 200. In other embodiments, a GPU is integrated on a single chip with a bus bridge, such as memory bridge 205 or I/O bridge 207.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 213. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Figure 3:
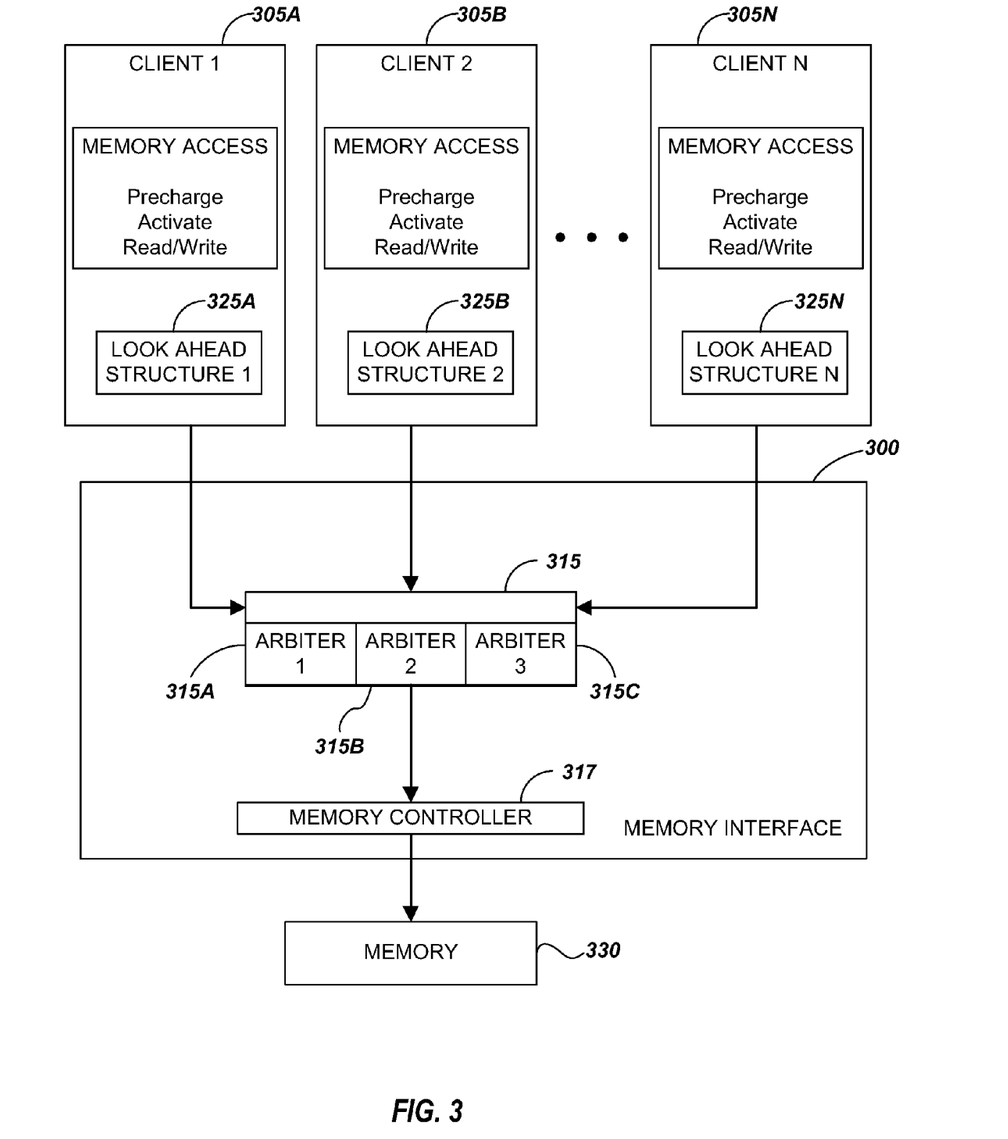
FIG. 3 illustrates a high level view of a computer system with several clients requesting data from the memory controller using look ahead structures, in accordance with one embodiment of the invention.

FIG. 3 illustrate a memory interface 300 used in computer system 200 incorporating a look ahead structure which allows for bank management to be performed early without excessive per-client dedicated buffering, in accordance with one embodiment of the invention. Memory interface 300 services N clients (client 1 305A, client 2 305B, . . . , client N 305N). For the purposes of illustration, three clients are shown although it will be understood that an arbitrary number of clients is contemplated. Memory interface 300 is used to provide access to a memory 330, which can be a DRAM. Clients 305A-305N include memory access commands such as precharge, activate, and read/write. Client 1 305A, client 2 305B, . . . , client N 305N also include look ahead structures (1, . . . , N) 325A, . . . , 325N, respectively. Memory interface 300 includes an arbiter module 315 as well as a memory controller 317. The arbiter module 315 further includes three arbiters 315A, . . . , 315C. Those skilled in the art will realize that different embodiments can use more or less than three arbiters depending on the application. In one embodiment the three arbiters are used as a precharge arbiter, activate arbiter and read/write arbiter. Unlike the prior art memory interface, which is illustrated in FIG. 1, memory interface 300 does not include a command queue. Clients 305A-305N determine when more data is needed and send individual requests to the memory controller 310 requesting that the memory controller 310 retrieve the specific data from the memory 330. The individual requests include the address, width and size of each array of data being requested. Clients 305A-305N also use look ahead structures to manage memory 330 through the memory controller 310.

The look ahead structure includes an RBD (row-bank-direction) queue and the tiering logic. The entries in the RBD queue is a parallel queue structure to the request queue, and can contain one entry for each row-bank-direction change, as well as additional entries for additional quantas of work to the same row-bank-direction. One entry in the RBD queue can correspond to many entries in the request queue. Tiers are created by exposing the head K entries of the RBD queue. The tiering logic manages look-ahead pointers to these tiers for purposes of efficient bank management. Further details are provided with reference to FIGS. 4A-5.

The tiering logic can have separate precharge and activate pointers identifying the tier which contains the next row-bank to be prepared by precharging and activating respectively. When a tier wins its respective arbitration, the pointer advances and the next tier is presented for arbitration. Whenever a tier loses the bank-state it once reached, the pointers are reset accordingly. Further details of the tiering are provided with reference to FIG. 5. The request queue can also carry a single-bit indication for "tier_changed" for the first reference of each tier. When this bit is seen and the request queue has already been partially unloaded for the current tier, the head tier is discarded. When the head tier is discarded, the RBD queue is popped, the existing tiers are relabeled, and the tier pointers are updated to reflect the new tier labeling.

The client look ahead structures 325A-325N, (RBD) FIFO, and tiering logic expose choices for precharge, activate, and read/write The three arbiters 315A, 315B, and 315C prepare memory 330 to access data. Arbiter 1 315A is used to precharge the memory, arbiter 2 315B is used to read/write to and from the memory, and arbiter 3 315C is used to activate the memory. The arbiter module 315 also prioritizes the commands generated by the three arbiters 315A, . . . , 315B before sending the commands out. Once the arbiters provide the appropriate commands to manage the memory 330 and the arbiter module 315 has prioritized those commands, the memory controller 317 sends the commands to the memory 330 to either write or retrieve data from the memory. If data is retrieved from the memory 330, then retrieved data is sent back to the clients 305A, . . . , 305N where it is stored in a respective client buffer until it is needed. Clients 305A, . . . , 305N then processes the retrieved data, as needed.

Arbiter module 315 includes three arbiters 315A, . . . , 315C, each which evaluate for arbitration the references and row-banks exposed by clients 305A through 305N Memory 330 can consists of banks of memory module that can be addressed by bank number, row number, and column number. In one embodiment, memory 330 can be SDRAM.

Figure 4A:
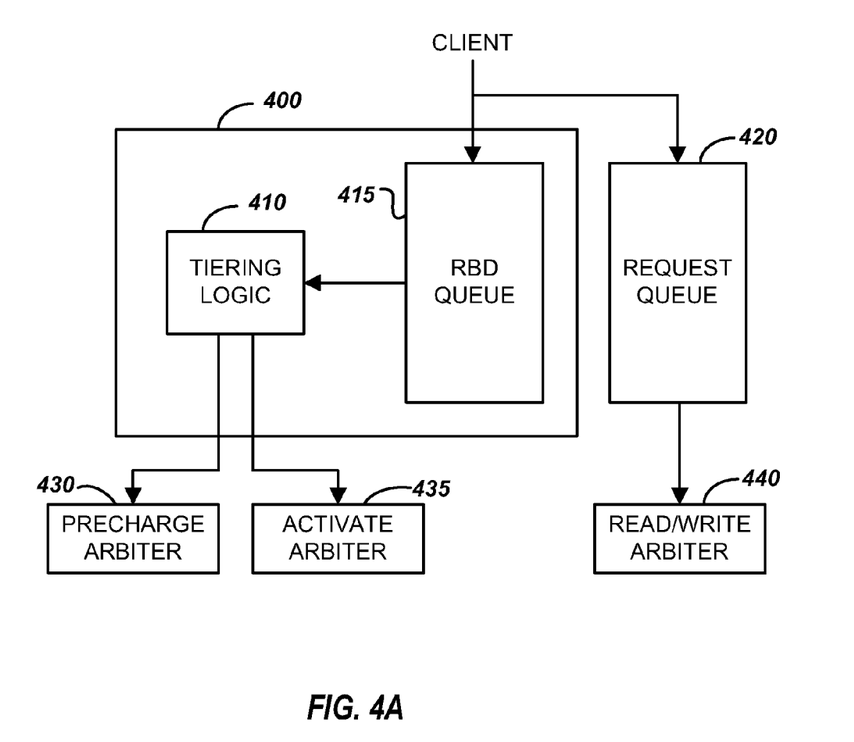
FIG. 4A is a block diagram illustrating the arrangement of a look ahead structure in a graphics processing unit, in accordance with one embodiment of the invention.

FIG. 4A is a block diagram illustrating the arrangement of a look ahead structure 400, including a tiering logic 410 and a row-bank-direction (RBD) queue 415, a request queue 420, a precharge arbiter 430, an activate arbiter 435, and read/write arbiter 440. The RBD queue 415 operates according to first-in-first-out (FIFO) principles. RBD queue 415 is a parallel queue structure to the request queue 420, and contains one entry for each row-bank-direction change, as well as additional entries for additional quantas of work to the same row-bank-direction. Details of addresses and commands stored in the RBD queue 415 and the parallel request queue 420 are described with reference to FIG. 4B. Similarly details of a table used in conjunction with the tiering logic 410 are described with reference to FIG. 4C. Details illustrating the flow of information between tiering logic 410, RBD queue 415, request queue 420 and other components used to control the memory are described with reference to FIG. 5. FIG. 4A shows that the client supplies addresses and commands to both the look ahead structure 400 and the request queue 420 so that both the RBD queue 415 and the request queue 420 can process these addresses and commands in parallel. The RBD queue then communicates with the tiering logic 410 which will output commands to precharge arbiter 430 and activate arbiter 435 which will eventually be used to efficiently manage the memory. The RBD queue 415 also directly communicates with the read/write arbiter 440 to efficiently manage the memory. Finally the request queue 420 is coupled to the read/write arbiter and commands to read or write are processed through the arbiter in an efficient manner.

Look ahead structure 400 includes tiering logic 410 that contains separate precharge and activate pointers identifying the tier which contains the next row-bank to be prepared by precharging and activating respectively. When a tier wins its respective arbitration, the pointer advances and the next tier is presented for arbitration. Whenever a tier loses the bank-state it once reached, the pointers are reset accordingly. This may be implemented by receiving bank state information from the hit, miss, closed module. A flush signal may also reset the pointers to the head of the RBD FIFO. An example case requiring flushing would be a DRAM refresh precharging all DRAM banks.

Figure 4B:
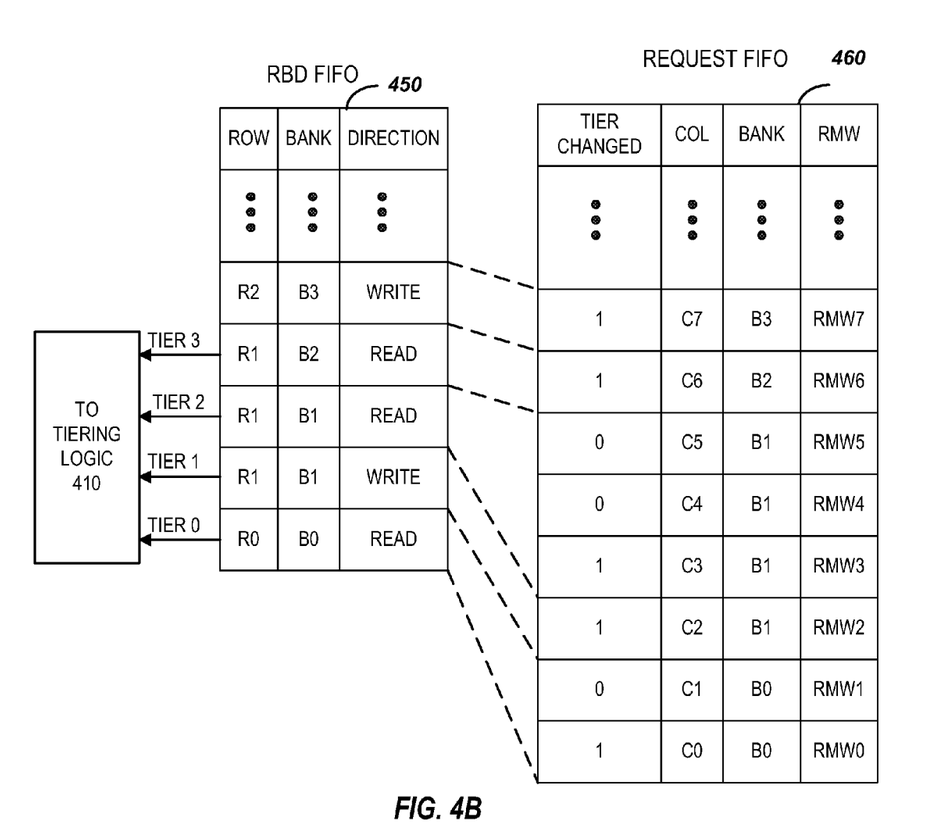
FIG. 4B is a block diagram illustrating an RBD FIFO and a Request FIFO containing entries of the RBD queue and request queue, respectively as shown FIG. 4A.

FIG. 4B is a block diagram illustrating an example of a request stream, which shows the RBD queue 415 entries and request queue 420 entries as an RBD FIFO (First-In-First-Out) 450 and a Request FIFO 460, respectively. The RBD FIFO 450 representing the RBD queue 415 and the Request FIFO 460 representing the request queue 420 are shown side by side and in parallel to illustrate that the client can supply addresses and commands to both the RBD queue 415 and the request queue 420 at substantially the same time and both the RBD queue 415 and the request queue 420 can process the addresses and commands in parallel. RBD FIFO 450 includes columns for the row, bank direction. Request FIFO 460 includes columns for the read-modify-write, column address, bank and a bit for tier changed indicator. When this bit is seen and the request queue has already been partially unloaded for the current tier, the head tier is discarded. In other embodiments, a different number of bits can be used to indicate a tier changed. The request FIFO 460 can also include a field for direction. The arbiter looks at field for direction and chooses another client in the same direction when Read/Write direction changes from the current client. RBD FIFO 450 entries are connected to the request FIFO 460 entries with dotted lines to illustrate that one entry from RBD queue 415 can be mapped to one or more entries in the request queue 420. As the address is sent from the client to the RBD queue 415 and the request queue 420, the addresses are split into two streams with one part of the stream becoming an entry in the request FIFO 460 and the other part of the stream becoming an entry in the RBD FIFO 450 if "TIER_CHANGED=1". The bank entry is redundant and is shown as being stored in both the RBD FIFO 450 and the request FIFO 460, although this is not required. In an alternative embodiment, the bank is stored solely in the RBD FIFO 450 and the RW ARB 540 is provided with the bank information from the RBD FIFO 450.

RBD FIFO 460 which is part of the RBD queue 415 is coupled to the Tiering Logic 410 and transmits information to the Tiering Logic as illustrated in FIG. 4B. The lower four entries of the RBD FIFO 460 are coupled to the Tiering Logic 410 with the output of the first entry labeled as Tier 0, the output of the second entry labeled as Tier 1, the output of the third entry labeled as Tier 2, and the output of the fourth entry labeled as Tier 3.

Figure 4C:
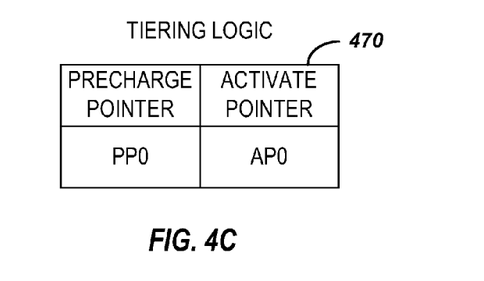
FIG. 4C is a block diagram illustrating a tiering logic table including information from the tiering logic of FIG. 4A, in accordance with one embodiment of the invention.

FIG. 4C is a block diagram illustrating the tiering logic 410 entries as a tiering logic table 470. Tiering Logic table 470 includes a precharge pointer and activate pointer. The pointers stored in the tiering logic table 470 are mux selects used to steer the precharge and activate tier select muxes. The memory bank is prepared by RBD FIFO 450 and REQUEST FIFO 460 are used to read and write to the memory.

Figure 5:
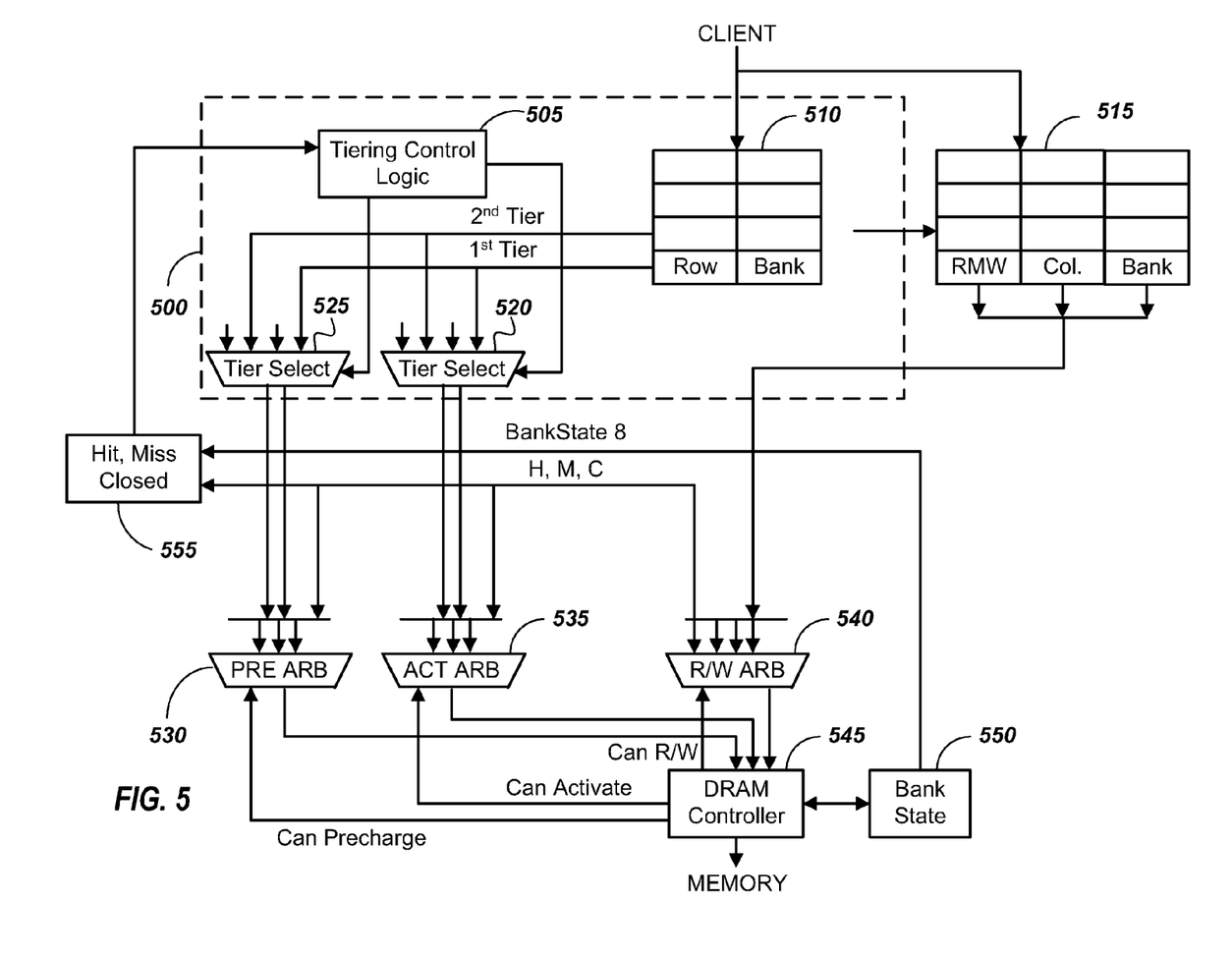
FIG. 5 is a block diagram illustrating a memory interface between a client and DRAM memory in a GPU using a look ahead structure in accordance with one embodiment of the invention.

FIG. 5 is a block diagram illustrating a memory interface between a client and DRAM memory in a GPU using a look ahead structure in accordance with one embodiment of the invention. The look ahead structure 500 which includes a tiering control logic 505 and a row-bank-direction (RBD) queue 510, is located within the tiered client. The tiering control logic 505 communicates to tier precharge select mux 520 and tier activate select mux 525. The look ahead structure 500 is set up in parallel to the request queue 515. The memory interface further includes a precharge arbiter (PRE ARB) 530, an activate (ACT) ARB 535, a Read/Write (R/W) ARB 540, a DRAM Controller 545, a Bank State Reporter Module 550, and a Hit-Miss-Closed Module 555

The row-bank-direction (RBD) queue 510 is a matrix showing memory requests from the client for different count, row and banks. Similarly, the request queue 515 is a matrix showing possible read-modify-write operations and respective column addresses and bank which are used to carry out requests from the client.

The look ahead structure 500 includes a precharge tier select mux 520 and an activate tier select mux 525, which are both coupled to the RBD queue 510. Tier selects 520 and 525 are multiplexers (MUX), which are used to expose the next available precharge or activate command. Tier select mux 520 is directly coupled to the activate arbiter 535 whereas tier select mux 525 is directly coupled to the precharge arbiter 530. Tier select mux 520 and tier select mux 525 receive inputs from the RBD queue 510 and sends one of these inputs to the outputs based on the values of one or more selection inputs or control inputs.

Precharge arbiter 530, activate arbiter 535, and read/write arbiter 540 act independently and each has its own separate respective client interface. The tier select mux 520 is used to couple the activate arbiter 535 to the RBD queue 510. The tier select mux 525 is used to couple the precharge arbiter 530 to the RBD queue 510. Similarly the request queue 515 is directly coupled to the Read/Write arbiter 540. Since the precharge, activate, and read/write each has its own arbiters independent arbitration is performed for each of these. Each arbiter 530, 535, and 540 includes rules to prevent memory bank conflicts such that the result of independent arbitration is an efficient staggering of sub-command phases in different memory banks. For example, while one memory bank is being accessed for a read/write sub-command on behalf of one client the independent arbitration permits activate sub-command phases and precharge sub-command phases to be performed on other memory banks on the behalf of other clients.

The precharge arbiter 530 examines client memory access request commands and arbitrates precharge sub-commands to determine whether a precharge needs to be done to close a row in a bank. That is, precharge arbiter 530 examines open rows and makes an arbitration decision regarding which open banks, if any, should be closed on a particular clock cycle. In one embodiment, a precharge closes when there is a miss to a bank. When there is a simultaneous hit and miss to a particular bank from different clients, then precharge arbiter 530 may weigh the client priorities and elect to close or not close the bank. In other words, in one embodiment precharge arbiter 530 considers client priorities and also hits and misses in determining whether to close a bank. There also may be a timer that closes a bank after a timeout period when there is no hit demand for that bank. The tiering control logic may issue information via a "commit bit" to the precharge arbiter. This informs the precharge arbiter that a subsequent bank has been activated by a tiered client, and that there are still column address references in request FIFO 510 corresponding to that bank for previous tiers. This prevents the precharge arbiter from closing that bank before those column references have been exposed at the head of the request FIFO 510.

The activate arbiter 535 examines client memory access requests and arbitrates activate sub-commands to determine which bank needs to be open (and which row activated) in a particular clock cycle. That is, activate arbiter 535 examines closed rows of banks and makes an arbitration decision regarding which closed row/bank, if any, should be activated on a particular clock cycle.

The read/write arbiter 540 examines client memory access requests and arbitrates read/write sub-commands to determine which read/write sub-commands get to banks to do a read and a write. That is, read/write arbiter 540 examines activated banks/rows and makes an arbitration decision regarding which read/write sub-commands should be issued for activated rows. In one embodiment, misses are blocked from arbitration in the read/write arbiter 540 until a hit.

DRAM controller 545 is coupled to a bank state reporter module 550 that monitors which banks are active, which rows are active, and monitors timing parameters. The bank state reporter 550 is coupled to the Hit-Miss-Closed module 555, which determines if there was a hit, missed or closed bank. Bank state reporter module 550 generates control signals that are provided to precharge arbiter 530, activate arbiter 535, read/write arbiter 540, and the Hit-Miss-Closed module 555 based on the status of the DRAM memory, which is not shown. In one embodiment, an individual bit, called a touch bit, is used to indicate at least one read/write has been performed on a bank. The purpose of the touch bit is to prevent the precharge arbiter 530 from closing a newly opened bank that has not yet performed a read/write. For example, in one implementation, a bank remains open (within a timeout period) until it is read/written, at which time the touch bit is set, making the bank eligible for precharge. In one implementation a default condition is that a bank that has been touched remains open to facilitate servicing additional read/write sub-commands from the same client that initiated the initial touch.

The information provided by bank state reporter 550 to precharge arbiter 530, activate arbiter 535, and read/write arbiter 540 allow for independent arbitrations based on information regarding the bank state. For example, in order for an activate to happen on a particular bank, the bank has to be already shut. Thus, arbitration decisions made by activate arbiter 535 are performed by arbitrating between banks already closed, which requires information about the bank state sufficient to identify banks that are closed. The read/write arbiter 540 arbitrates between banks already open and matching the same row ("a hit"), which requires information about the bank state sufficient to identify open banks. Precharge is performed only on open banks. Thus, precharge arbiter 530 also requires information about bank state sufficient to identify open banks.

In one embodiment precharge arbiter 530, activate arbiter 535, and read/write arbiter 540 use memory timing parameters to manage the memory. In this embodiment the bank state reporter module 555 also acquires and provides timing parameters so that arbiters 530, 535, and 540 can estimate when banks will be available for precharge, activate, and read/write operations. Further details of how the arbiters take into account timing parameter are disclosed in the co-pending and co-owned patent application of James Van Dyke et al., titled "Memory Interface with Independent Arbitration of Precharge, Activate, and Read/Write," U.S. Provisional Patent Application No. 60/813,803, filed on Jun. 14, 2006, the disclosure of which is incorporated herein by reference in its entirety.

In one embodiment, DRAM controller 545 receives the arbitration decisions of the different arbiters 530, 535, and 540 and then DRAM controller 545 issues precharge, activate, and read/write sub-commands to DRAM memory. As previously described, the different arbiters 530, 535, and 540 have bank state information from which they determine an appropriate set of banks/rows to perform an arbitration. For example, on a particular clock cycle, clients arbitrated by the activate arbiter 535 are not arbitrated by the read/write arbiter 540 because the activate arbiter arbitrates with respect to closed banks whereas the read/write arbiter 540 arbitrates with respect to activated banks/rows. Therefore, while the arbitration decisions of the different arbiters 410, 415, and 420 are made independently the arbitration rules that are applied result in an efficient bank interleaving that avoids bank conflicts.

Arbitration decisions can be based on many factors that are weighed against each other. In one embodiment, an individual request has a priority defined by a weight based on client urgency (how urgently a client needs a memory access) and efficiency (how efficient the memory access is likely to be given the size of transfers and latency).

It will also be recognized by those skilled in the art that, while the present invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A computer system comprising:
   a plurality of clients that request access to a memory, wherein each of the plurality of clients comprises a look ahead structure and a request queue for queuing memory access requests, wherein said look ahead structure includes:
   a row bank direction queue having a plurality of entries, each entry indicating at least a memory row to be accessed and a read or write direction for the access;
   an activation selection logic circuit coupled to receive a plurality of entries from said row bank direction queue and configured to select one of said entries in said row bank direction queue as an activation candidate tier; and
   a precharge selection logic circuit coupled to receive said plurality of entries from said row bank direction queue and configured to select one of said entries in said row bank direction queue as a precharge candidate tier; and
   a memory interface coupled between said plurality of clients and said memory, wherein said memory interface comprises:
   a first arbiter coupled to receive said activation candidate tier from each of said clients and configured to select one of said activation candidate tiers as an activation command to be sent to said memory;
   a second arbiter coupled to receive said precharge candidate tier from each of said clients and configured to select one of said precharge candidate tiers as a precharge command to be sent to said memory; and
   a third arbiter coupled to receive a candidate memory access request from said request queue of each of said clients and configured to select one of said candidate memory access requests as a read or write command to be sent to said memory.

2. The computer system of claim 1 wherein said request queue includes a read-modify-write (RMW) operation field and a column address.

3. A computer system comprising:
   a first client that requests access to a memory;
   a first request queue coupled to said first client for queuing said memory requests from said first client;
   a memory interface coupled to said first client and to said memory, wherein said memory interface comprises a precharge arbiter, an activate arbiter, a read/write arbiter to receive requests from said first request queue, and a memory controller;

a look ahead structure within said first client and coupled to said memory interface, wherein said look ahead structure includes tiering logic to select a precharge candidate tier for a precharge request and an activation candidate tier for an activation request, wherein said precharge candidate tier and said activation candidate tier each identify a row, a bank, and a direction, wherein said look ahead structure outputs said precharge candidate tier to said precharge arbiter and said activation candidate tier to said activate arbiter, wherein said memory controller sequences commands to said memory based at least in part on respective outputs of said precharge arbiter, said activate arbiter, and said read/write arbiter.

4. The computer system of claim 3 wherein said look ahead structure further comprises a row-bank-direction queue having a plurality of entries and wherein each entry in said row-bank-direction queue is associated with one or more of said memory requests in said request queue.

5. The computer system of claim 4 wherein said memory interface further comprises a hit-miss-closed module coupled to said tiering logic, said precharge arbiter, said activate arbiter, and said read/write arbiter, wherein said hit-miss-closed module provides memory bank status information to said tiering logic, said precharge arbiter, said activate arbiter, and said read/write arbiter.

6. The computer system of claim 3 wherein said tiering logic comprises a first tier select and a second tier select, wherein said first tier select includes a first mux output that is coupled to said precharge arbiter and said second tier select includes a second mux output that is coupled to said activate arbiter.

7. The computer system of claim 4 wherein said tiering logic comprises a first tier select and a second tier select, wherein said first tier select includes a first mux having two or more inputs, each input coupled to receive a different one of said entries in said row-bank-direction queue, and an output that is coupled to said precharge arbiter and said second tier select includes a second mux having two or more inputs, each input coupled to receive a different one of said entries in said row-bank-direction queue, and an output that is coupled to said activate arbiter.

8. A method of managing memory requests in a computer system, comprising:

sending a memory access request from a first client to a look ahead structure associated with said first client and to a request queue associated with said first client, wherein said look ahead structure comprises a row bank direction queue and a tiering logic coupled to said row bank direction queue, wherein said row bank direction queue has space to store a plurality of entries, each entry indicating at least a row and a direction for one or more of said memory access requests;

checking memory state information for a memory to be accessed;

using said tiering logic and based at least in part on said memory state information, selecting one or more of a first entry from said row bank direction queue to send as a precharge candidate tier to a precharge arbiter, a second entry from said row bank direction queue to send as an activation candidate tier to an activate arbiter, or a third entry from said request queue to send as a read/write candidate to a read/write arbiter, wherein said precharge arbiter, said activate arbiter, and said read/write arbiter are configured to operate independently from one another;

selecting, using said precharge arbiter and based at least in part on said memory state information, a location in said memory to be precharged;

selecting, using said activate arbiter and based at least in part on said memory state information, a location in said memory to be activated;

selecting, using said read/write arbiter and based at least in part on said memory state information, a location in said memory to read or write; and precharging, activating and reading or writing said memory according to said selections.

9. The method of claim 8 wherein checking memory state information includes relaying the bank state as a hit, miss or closed to said precharge arbiter, said activate arbiter, and said read/write arbiter.

10. The computer system of claim 1, wherein said first arbiter, said second arbiter, and said third arbiter operate independently from one another.

11. The computer system of claim 10, wherein each of said precharge and activate first and second arbiters simultaneously performs a different sub-command phase on a different memory bank of said memory.

12. The computer system of claim 3, wherein said precharge arbiter and said activate arbiter operate independently from one another.

13. The computer system of claim 12, wherein each of said precharge and activate arbiters simultaneously performs a different sub-command phase on a different memory bank of said memory.

14. The computer system of claim 1 wherein each of said memory access requests in said request queue is associated with one of said entries in said row bank direction queue and wherein a single entry in said row bank direction queue is associatable with more than one of said memory access requests in said request queue.

15. The computer system of claim 1 wherein said activation selection logic circuit and said precharge selection logic circuit each select from a subset of said entries in said row bank direction queue.

16. The computer system of claim 1 further comprising:

bank state information circuitry coupled to said memory and configured to provide memory state information from said memory to said first arbiter, said second arbiter, and said third arbiter, and wherein said first arbiter, said second arbiter, and said third arbiter make respective selections based at least in part on said memory state information.

17. The computer system of claim 16 wherein said bank state information circuitry is further configured to provide said memory state information to said look ahead structure in each of said clients, wherein said activation selection logic is further configured to select said activation candidate tier based at least in part on said memory state information and said precharge selection logic is further configured to select said precharge candidate tier based at least in part on said memory state information.

18. The computer system of claim 16 wherein said memory state information includes bank information for each of a plurality of banks in said memory and wherein said bank information for a particular bank includes one or more of:

a closed indicator indicating whether said particular bank is closed;

a hit or miss indicator indicating whether a hit or miss has occurred to said particular bank;

a timeout indicator indicating whether a timeout period has elapsed without a hit demand for said particular bank; or a touch indicator indicating whether at least one read operation from or write operation to said particular bank has occurred since said particular bank was opened.

19. The computer system of claim 1 wherein said first arbiter, said second arbiter, and said third arbiter make respective selections based in part on a client urgency associated with said plurality of clients and an efficiency associated with said request.

20. The computer system of claim 3 further comprising:
one or more additional clients coupled to said memory interface, wherein each of said additional clients outputs a precharge candidate tier to said precharge arbiter and an activation candidate tier to said activate arbiter; and
one or more additional request queues, each of said one or more additional request queues being coupled to a different one of said one or more additional clients for queuing memory requests from said different one of said one or more additional clients,
wherein said precharge arbiter arbitrates among said precharge candidate tiers from said first client and said one or more additional clients,
wherein said activate arbiter arbitrates among said activation candidate tiers from said first client and said one or more additional clients, and
wherein said read/write arbiter arbitrates among said memory requests from said first request queue and said one or more additional request queues.

21. The computer system of claim 3 further comprising:
bank state information circuitry coupled to said memory and configured to provide memory state information from said memory to said precharge arbiter, said activate arbiter, and said read/write arbiter, and wherein said precharge arbiter, said activate arbiter, and said read/write arbiter make respective selections based at least in part on said memory state information.

22. The computer system of claim 21 wherein said bank state information circuitry is further configured to provide said memory state information to said tiering logic, and wherein said tiering logic is further configured to select said precharge candidate tier and said activation candidate tier based at least in part on said memory state information.

23. The computer system of claim 21 wherein said memory state information includes bank information for each of a plurality of banks in said memory and wherein said bank information for a particular bank includes one or more of:
a closed indicator indicating whether said particular bank is closed;
a hit or miss indicator indicating whether a hit or miss has occurred to said particular bank;
a timeout indicator indicating whether a timeout period has elapsed without a hit demand for said particular bank; or
a touch indicator indicating whether at least one read operation from or write operation to said particular bank has occurred since said particular bank was opened.

24. The computer system of claim 4 wherein said tiering logic selects said precharge candidate and said activation candidate from a subset of said entries in said row-bank-direction queue.

25. The method of claim 8 wherein:
said precharge arbiter receives, in addition to said precharge candidate tier from said first client, one or more additional precharge candidate tiers from one or more additional clients and selects among said received precharge candidate tiers;
said activate arbiter receives, in addition to said activation candidate tier from said first client, one or more additional activation candidate tiers from said one or more additional clients and selects among said received activation candidate tiers; and
said read/write arbiter receives, in addition to said read/write candidate from said first client, one or more additional read/write candidates from said one or more additional clients and selects among said received read/write candidates.

26. The method of claim 8 wherein said precharge arbiter, said activate arbiter, and said read/write arbiter operate independently from one another.

* * * * *